United States Patent Office 3,787,425
Patented Jan. 22, 1974

3,787,425
HALOPYRIDYL THIOCYANATES
Penelope B. Domenico, Danville, Calif., assignor to The Dow Chemical Company, Midland, Mich.
No Drawing. Original application June 30, 1971, Ser. No. 158,568. Divided and this application Feb. 9, 1973, Ser. No. 331,091
Int. Cl. C07d 31/50
U.S. Cl. 260—294.8 G
3 Claims

ABSTRACT OF THE DISCLOSURE

Compounds corresponding to the formula

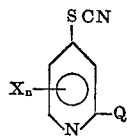

wherein each X independently represents chloro or bromo; n represents an integer of from 1 to 3; and Q represents cyano (—CN), trifluoromethyl (—CF$_3$), methylsulfonyl (—SO$_2$CH$_3$), chloro or bromo are prepared and are useful as bactericides and fungicides.

CROSS-REFERENCE TO RELATED APPLICATION

This is a division of application Ser. No. 158,568, filed June 30, 1971.

SUMMARY OF THE INVENTION

The present invention is directed to haylopyridylthiocyanates corresponding to the formula

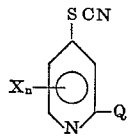

In this and corresponding formulae, each X independently represents chloro or bromo; n represents an integer of from 1 to 3; and Q represents cyano (—CN), trifluoromethyl (—CF$_3$), methylsulfonyl, chloro or bromo.

For convenience, the compounds embraced by the generic formula will be identified as halopyridylthiocyanates.

The halopyridylthiocyanates of the present invention are crystalline solids or oils which are of low solubility in water and of modern solubility in common organic solvents. These compounds have low phytotoxicity and are suitable for use as bactericides and fungicides.

The compounds of the present invention are prepared by the reaction of an appropriate halopyridylsulfenylchloride with an alkali metal cyanide in the presence of a reaction medium. This reaction can be represented as follows:

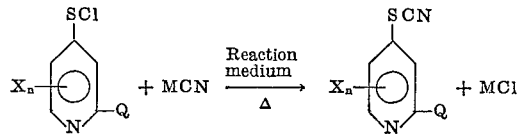

wherein X, n and Q are as hereinbefore defined and M represents sodium, lithium, potassium, cesium or rubidium.

In carrying out this reaction, the reactants are contacted together in the presence of an inert reaction medium or carrier liquid such as, for example, glacial acetic acid, dichloracetic acid or trifluoroacetic acid. The reaction is preferably carried out at room temperature, although temperatures in the range of 0° to 100° C. can be employed. The reaction is usually carried at atmospheric pressure.

The reactants are maintained together, under agitation, until the reaction is complete. The required reaction time is usually between about 30 minutes to 4 hours. Upon completion of the reaction, the reaction mixture is diluted with cold water to precipitate out any solid product. The solid product can be purified, if desired, by recrystallization from benzene, hexane, pentane or mixtures thereof.

An alternative procedure for preparing the above halopyridylthiocyanates involves the direct replacement of a thiocyanato (—SCN) group in a halo(pyridylthio)thiocyanate with a cyano (—CN) group. The reaction can be represented as follows:

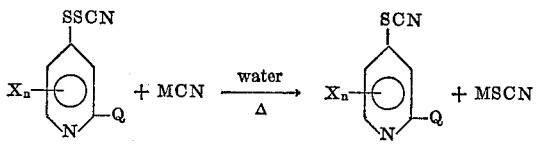

wherein X, n, Q and M are as hereinbefore defined.

In carrying out this reaction, an appropriate halo(4-pyridylthio)thiocyanate is reacted with an alkali metal cyanide in the presence of an inert reaction medium or carrier liquid such as, for example, water, aqueous ethanol or dimethylformamide. The reactants are maintained together under agitation and at a temperature in the range of from about 25° C. to about 90° C. until the reaction is complete. The reaction time is usually from about one minute to one hour. Upon completion of the reaction, the mixture is usually cooled, diluted with cold water and the solid which precipitates is recovered by filtration and dried. The crude product can be purified as set forth hereinabove. In an additional method of purification, the solid can be extracted with a solvent such as hot benzene, the resulting solution dried with a desiccant such as sodium sulfate and filtered to remove the desiccant and thereafter precipitating the product by adding to the filtrate a second solvent such as hexane. The purified product is recovered by filtration and dried.

DESCRIPTION OF SOME PREFERRED EMBODIMENTS

The following examples illustrate the present invention and the manner by which it can be practiced but, as such, should not be construed as limitations upon the overall scope of the same.

Example I 2,3,5,6-tetrachloro-4-(thiocyanato)pyridine

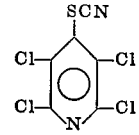

To a solution containing 2.0 grams (0.007 mole) of 2,3,5,6-tetrachloro - 4 - (pyridylthio)thiocyanate and 15 milliliters of water, under agitation, was added a solution consisting of 0.47 gram (0.01 mole) of sodium cyanide and 10 milliliters of water. The mixture was heated to 90° C. for two minutes. The reaction mixture was thereafter cooled, poured into ice water and the solid which precipitated was recovered by filtration and dried. The crude solid 2,3,5,6-tetrachloro-4-(thiocyanato)pyridine product was taken up in hot benzene, dried with sodium sulfate, filtered to remove the sodium sulfate and the benzene was thereafter partially evaporated off. Hexane was added to this mixture and the product which precipitated was recovered by filtration and dried. The product was recovered in a yield of 57.6 percent of theoretical and melted at 125° C. The product was found by analysis to have carbon, chlorine, nitrogen and sulfur contents of 26.20, 53.84, 10.25 and 11.91 weight percent, respectively, as compared to the theoretical contents of 26.32, 51.50, 10.24 and 11.60 percent, respectively, calculated for the above named structure.

Example II 2,3,5,6-tetrachloro-4-(thiocyanato)pyridine

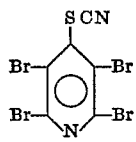

To a solution consisting of 9.85 grams (0.02 mole) of 2,3,5,6 - tetrabromo-4-pyridinesulfenylchloride and 200 milliliters of glacial acetic acid, under agitation, was added over a 10 minute period, 1.52 grams (0.03 mole) of sodium cyanide. The mixture was heated to about 40° C. and maintained at this temperature and under agitation for 3 hours. During this time, an additional 0.55 gram of sodium cyanide was added thereto. The reaction mixture was filtered to remove insoluble materials therefrom and the mother liquor was poured into ice water. The 2,3,5,6-tetrabromo-4-(thiocyanato)pyridine product was recovered by filtration and dried. The product melted at 150° C., with decomposition, and was recovered in a yield of 69.6 percent of theoretical. Upon analysis, the product was found to have carbon, bromine, nitrogen and sulfur contents of 16.2, 71.0, 5.6 and 6.9 weight percent, respectively, as compared with the theoretical contents of 16.0, 70.7, 6.2 and 7.1 percent calculated for the above named structure.

Example III 2,3,5-trichloro-6-cyano-4-(thiocyanato)pyridine

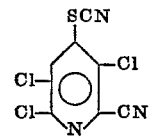

To an agitated solution consisting of 9.55 grams (0.04 mole) of 2,3,5 - trichloro-6-cyano-4-pyridinesulfenylchloride and 175 milliliters of glacial acetic acid was slowly added 2.45 grams (0.05 mole) of sodium cyanide. The mixture was maintained under agitation and at room temperature for 2½ hours. Agitation was stopped and the mixture allowed to settle for ½ hour. The insoluble material present was removed by decantation and filtration and the filtrate was poured over ice. The resulting precipitate of crude solid 2,3,5-trichloro-6-cyano-4-(thiocyanato) pyridine was recovered by filtration and recrystallized from a benzene-pentane mixture. Upon analysis, the product was found to have carbon, hydrogen, nitrogen, chlorine and sulfur contents of 31.4, 0.5, 15.4, 40.6 and 12.1 weight percent, respectively, as compared with the theoretical contents of 31.6, 0.0, 15.0, 40.1 and 12.2 percent, respectively, calculated for the above named structure. Additional product crystals were obtained from the aqueous mother liquor by extraction thereof with a benzene-methylene chloride mixture. The recovered crystals were purified by recrystallization. Upon analysis, this additional product was found to have carbon, hydrogen, nitrogen, chlorine and sulfur contents of 32.0, 0.3, 14.5, 40.5, and 12.3 weight percent, respectively, as compared with the theoretical contents set forth hereinabove. The combined product was found to melt at 103.5°–107.5° C., with decomposition.

Example IV 2,6-dichloro-4-(thiocyanato)pyridine

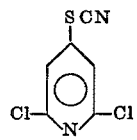

Two grams (0.0111 g. mole) of 2,6-dichloro-4-pyridine thiol was added incrementally with stirring to 10 milliliters of dichloro methane saturated with chlorine, at 0° C. The reaction mixture was allowed to warm to a temperature of 10° C. during the addition and then to about 25° while stirring for an hour. Thereafter it was filtered to remove a small amount of insolubles, stripped of solvent under aspirator vacuum and the solid residium (crude 2,6 - dichloro - 4 - pyridyl sulfenyl chloride) immediately slurried with a glacial acetic acid solution of sodium cyanide (0.6 gram; 0.0122 g. mole) After stirring at room temperature for two hours, the mixture was diluted with cold water and the resulting solid precipitate was filtered out, dried and extracted with pentane. One gram (44.5% of theory) of crystalline product, melting point 68° C., was recovered from the extract and a sample analyzed:

| | Weight percent | | | | |
| --- | --- | --- | --- | --- | --- |
| | C | H | Cl | N | S |
| Found | 34.7 | 1.1 | 35.68 | 12.4 | 15.98 |
| Calculated (for name compound) | 35.14 | 0.98 | 34.58 | 13.7 | 15.64 |

The following compounds of the present invention are prepared in accordance with the methods hereinbefore set forth.

3 - bromo - 5 - chloro-2-(methylsulfonyl)-4-(thiocyanato) pyridine having a molecular weight of 327.59;

5 - bromo - 3 - chloro-2-cyano-4-(thiocyanate)pyridine having a molecular weight of 274.52;

3 - bromo - 5-chloro-2-(trifluoromethyl)-4-(thiocyanato) pyridine having a molecular weight of 317.52;

3 - bromo - 2-(trifluoromethyl)-4-(thiocyanato)pyridine having a molecular weight of 283.06;

2 - bromo - 3 - chloro-4-(thiocyanato)pyridine having a molecular weight of 249.51;

2 - bromo - 6 - chloro-4-(thiocyanato)pyridine having a molecular weight of 249.51;

2 - bromo - 3,6 - dichloro - 4-(thiocyanato)pyridine having a molecular weight of 283.97;

5 - chloro - 2 - cyano - 4 - (thiocyanato)pyridine having a molecular weight of 195.60;

3 - chloro - 2 - (methylsulfonyl)-4(thiocyanato)pyridine having a molecular weight of 248.67;

2,6 - dibromo - 4 - (thiocyanato)pyridine having a molecular weight of 293.97;

2,3 - dichloro - 4 - (thiocyanato)pyridine having a molecular weight of 205.05;

2,3,5-trichloro-4-(thiocyanato)pyridine having a melting point of 88.3–92.3° C., 3,5,6 - trichloro - 2 - (trifluoromethyl)-4-(thiocyanato) pyridine having a molecular weight of 307.52;

3,5 - dichloro - 2 - (trifluoromethyl)-4-(thiocyanato) pyridine having a molecular weight of 273.06;

3,5 - dibromo - 6 - chloro - 2-(methylsulfonyl)-4-(thiocyanato)pyridine having a molecular weight of 406.51; and 2,3,6-tribromo-4-(thiocyanato)pyridine having a molecular weight of 372.89.

In accordance with the present invention, it has been discovered that the halopyridylthiocyanates can be employed for the control of many bacterial and fungal organisms. In still further operations, the compounds of the present invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by mico-organisms. Also, the compounds can be distributed in textiles or cellulosic materials to preserve and protect such products from the attack of the organisms of rot, mold and decay.

The exact concentration of the toxicant to be employed in the treating compositions is not critical and may vary considerably provided the required dosage of the effective agent is supplied in the ink, adhesive, soap, cutting oil, polymeric material, paint, textile, paper, or growth medium. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a spray, it is often convenient to prepare the compounds as wettable powders.

In a representative operation, 2,3,5,6-tetrachloro-4-(thiocyanato)pyridine when employed as the sole toxicant in a nutrient agar at a concentration of about 500 parts by weight of the compound per million parts of agar was found to give 100 percent kill and control of the organisms. *Staphylococcus aureus, Escherichia coli, Candida albicans, Trichophyton mentagrophytes, Bacillus subtilis, Aspergillus terreus, Candida pelliculosa, Pullularia pullulans, Salmonella typhosa, Mycobacterium phlei, Ceratocystis ips, Cephaloascus fragans* and *Trichoderma sp. Madison P–42.* In another operation, the compound is also found to give 100 percent kill and control of the same organisms at a concentration of 100 parts by weight of the compound per million parts of agar.

In additional operations, employing 2,3,5,6-tetrabromo-4-(thiocyanato)pyridine was found to give 100 percent kill and control of the organisms *Staphylococcus aureus, Candida albicans, Mycobacterium phlei, Trichophyton mentagrophytes, Bacillus subtilis, Candida pelliculasa, Pullula pullulans, Cephaloascus fragans, Aspergillus terreus, Ceratocystis ips* and *Trichoderma sp. Madison P–42,* when employed as the sole toxicant in a nutrient agar at a concentration of about 100 parts by weight of the compound per million parts of agar.

In another representative operation, employing the same nutrient agar and toxicant concentration, 2,3,5-trichloro-4-(thiocyanato)pyridine was found to give 100 percent kill and control of the organisms. *Staphylococcus aureus, Candida albicans, Mycobacterium phlei, Trichophyton mentagrophytes, Bacillus subtillis, Salmonella typhosa, Candida pelliculosa, Pullularia pullulans, Cephaloascus fragans, Aspergillus terreus, Ceratocystis ips* and *Trichoderma sp. Madison P–42.*

In an additional operation employing the same toxicant concentration and nutrient agar, 3,5,6-trichloro-2-cyano-4-(thiocyanato)pyridine was found to give 100 percent kill and control of the organisms *Staphylococcus aureus, Canadia albicans, Mycobacterium phlei, Trichophyton mentagrophytes, Bacillus subtilis, Salmonella typhosa, Candida pelliculosa, Pullularia pullulans, Caphaloscus fragans, Aspergillus terreus, Ceratocystis ips* and *Trichoderma sp. Madison P–42* and *Rhizopus nigricans.*

In further such operations, employing the same nutrient agar, 2,6-dichloro-4-(thiocyanato)pyridine was found to give 100% kill and control of the following organisms at the toxicant concentrations indicated:

| Organism: | Toxicant concentration in parts per million |
|---|---|
| Staphylococcus aureus | 100 |
| Candida albicans | 100 |
| Escherichia coli | 500 |
| Pseudomonas aruginosa | 500 |
| Pseudomonas sp. strain 10 | 500 |
| Salmonella typhosa | 500 |
| Mycobacterium phlei | 10 |
| Athletes foot | 10 |
| Bacillus subtilis | 100 |
| Candida pelliculosa | 10 |
| Aerobacter aerogenes | 500 |
| Pullularia pullulans | 100 |
| Cephaloascus fragans | 10 |
| Ceratocystis ips | 100 |
| Trichoderma sp. Madison P–42 | [1] 10 |
| Aspergillus terreus | 10 |
| Rhizopus nigricans | 500 |

When applied at a dosage level of from about 1 to 500 parts per million, each of the compounds of the present invention, the utility of which is not specifically recited hereinabove, has the ability to kill, inhibit or otherwise control one or more of the above said or other fungal or bacterial pests.

PREPARATION OF STARTING MATERIALS

The halopyridylsulfenylchlorides employed as starting materials can be prepared by reacting an appropriate halopyridine mercaptan corresponding to the formula

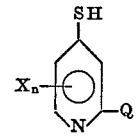

wherein X, n and Q are as hereinbefore defined, with chlorine. In carrying out this reaction, the halopyridine mercaptan is slowly added to an agitated solution of carbon tetrachloride, dichloromethane, or benzene, saturated with chlorine. The reaction is carried out at a temperature of from about minus 10° to about 60° C.

The halo(pyridylthio)thiocyanate employed as a starting material can be prepared by reacting an appropriate halopyridylsulfenylchloride with an alkali metal thiocyanate in the presence of an inert reaction medium such as, for example, benzene. The reaction is carried out at room temperature. Upon completion of the reaction, the solid product is recovered by evaporation of the solid. The product is purified by recrystallization from hexane.

What is claimed is:

1. A compound corresponding to the formula

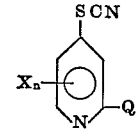

wherein each X independently represents chloro or bromo; n represents an integer of from 1 to 3; and Q represent cyano (—CN).

2. The compound of claim 1 corresponding to the formula

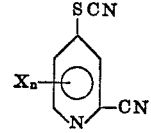

3. The compound of claim 2 which is 3,5,6-trichloro-2-cyano-4-(thiocyanato)pyridine.

References Cited

UNITED STATES PATENTS 3,635,994   1/1972   Domenico _____ 260—294.8 F

OTHER REFERENCES

Ager et al.: J. Chem. Soc. London, "C," pp. 1530–36 (1970).

Willems et al.: Chem. Abstracts, vol. 74, No. 23, 125, 575a, June 7, 1971.

Philips: Chem. Abstracts, vol. 75, No. 1, 5475s, July 5, 1971.

ALAN L. ROTMAN, Primary Examiner

U.S. Cl. X.R.

260—294.8 F, 294.9; 424—263

PO-1050
(5/69)

UNITED STATES PATENT OFFICE
CERTIFICATE OF CORRECTION

Patent No. 3,787,425          Dated January 22, 1974

Inventor(s) Penelope B. Domenico

It is certified that error appears in the above-identified patent and that said Letters Patent are hereby corrected as shown below:

Column 3, line 10, "2,3,5,6-tetrachloro" should read -- 2,3,5,6-tetrabromo --;

Column 5, line 11, change "mico" to -- micro --;

Column 5, line 50, correct spelling of "pelliculosa";

Column 5, line 69, correct spelling of "Candida";

Column 5, line 71, correct spelling of "Cephaloascus";

Column 6, line 22, insert the following footnote for the superscript [1]: -- inhibited at less than 1 ppm --;

Column 6, line 26, correct spelling of "inhibit";

Signed and sealed this 8th day of October 1974.

(SEAL)
Attest:

McCOY M. GIBSON JR.          C. MARSHALL DANN
Attesting Officer          Commissioner of Patents